(12) United States Patent
Arteta et al.

(10) Patent No.: US 11,560,963 B2
(45) Date of Patent: Jan. 24, 2023

(54) PRESSURE RELIEF VALVE

(71) Applicant: ILLINOIS TOOL WORKS INC., Glenview, IL (US)

(72) Inventors: Javier Arteta, Creglingen (DE); Thomas Steimer, Creglingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/325,903

(22) Filed: May 20, 2021

(65) Prior Publication Data
US 2021/0372538 A1 Dec. 2, 2021

(30) Foreign Application Priority Data

May 29, 2020 (DE) .................... 10 2020 114 541.1
Apr. 9, 2021 (DE) .................... 10 2021 108 861.5

(51) Int. Cl.
| | | |
|---|---|---|
| *F16K 15/14* | (2006.01) | |
| *F16K 27/02* | (2006.01) | |
| *F16K 27/12* | (2006.01) | |
| *F16K 31/126* | (2006.01) | |
| *F16K 17/08* | (2006.01) | |

(52) U.S. Cl.
CPC ........ *F16K 15/148* (2013.01); *F16K 27/0236* (2013.01); *F16K 17/085* (2013.01); *F16K 27/12* (2013.01); *F16K 31/1266* (2013.01); *Y10T 137/789* (2015.04)

(58) Field of Classification Search
CPC .. F16K 15/148; F16K 17/085; F16K 27/0236; F16K 27/12; F16K 31/1266; F16K 15/14; Y10T 137/7879; Y10T 137/7888; Y10T 137/789

USPC ............. 137/843, 852, 854, 515, 515.5, 860
See application file for complete search history.

(56) References Cited

U.S. PATENT DOCUMENTS

| | | | | |
|---|---|---|---|---|
| 3,297,048 A | * | 1/1967 | Imhof .................... | B60T 17/22 137/512 |
| 4,239,038 A | * | 12/1980 | Holmes ............... | A61M 16/208 128/205.13 |
| 5,161,571 A | * | 11/1992 | Nakazawa .............. | F16K 15/02 137/496 |
| 5,405,038 A | * | 4/1995 | Chuang ................. | B65B 31/047 137/522 |
| 6,889,707 B2 | * | 5/2005 | Nicolino ............... | F16K 15/148 137/513.3 |

(Continued)

FOREIGN PATENT DOCUMENTS

| | | | | |
|---|---|---|---|---|
| WO | WO-2018183804 A1 | * | 10/2018 | ............. F16K 47/08 |
| WO | WO-2018199238 A1 | * | 11/2018 | ............ F16K 15/148 |

*Primary Examiner* — Kenneth Rinehart
*Assistant Examiner* — Jonathan J Waddy
(74) *Attorney, Agent, or Firm* — Thompson Hine LLP

(57) ABSTRACT

A pressure relief valve includes a bowl-shaped housing having a bottom wall and an annular sealing wall, wherein the sealing wall delimits a valve through-opening, and a jacket wall. A cover is provided for covering a housing opening of the housing opposite to the bottom wall, having a diaphragm holder extending in the direction of the bottom wall. A diaphragm is provided for covering the valve through-opening, wherein the diaphragm is connected to the diaphragm holder and disposes the diaphragm holder sealingly on the annular sealing wall such that the valve through-opening is closed.

11 Claims, 4 Drawing Sheets

(56) References Cited

U.S. PATENT DOCUMENTS

| | | | |
|---|---|---|---|
| 7,007,715 B2 * | 3/2006 | Nakayama | F16K 17/0453 |
| | | | 137/512.4 |
| 8,925,574 B2 * | 1/2015 | Wilson | B60B 35/08 |
| | | | 137/542 |
| 2004/0182447 A1 * | 9/2004 | Nicolino | F16K 15/148 |
| | | | 137/513.5 |
| 2014/0291062 A1 * | 10/2014 | Tojo | B62D 5/0421 |
| | | | 180/443 |
| 2015/0090357 A1 * | 4/2015 | Yang | F16K 15/148 |
| | | | 137/843 |
| 2015/0151075 A1 * | 6/2015 | Kemps | A61M 16/206 |
| | | | 128/204.29 |
| 2016/0126517 A1 * | 5/2016 | Koch | H01M 50/333 |
| | | | 137/511 |
| 2018/0135768 A1 * | 5/2018 | Ho | F16K 15/148 |
| 2020/0032924 A1 * | 1/2020 | Sanders | F16K 47/08 |
| 2020/0340592 A1 * | 10/2020 | Nakayama | H01M 50/325 |

\* cited by examiner

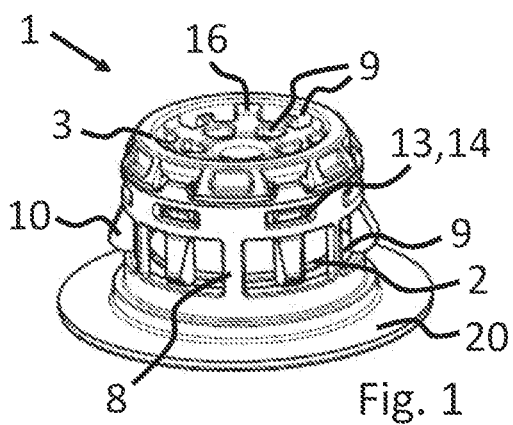
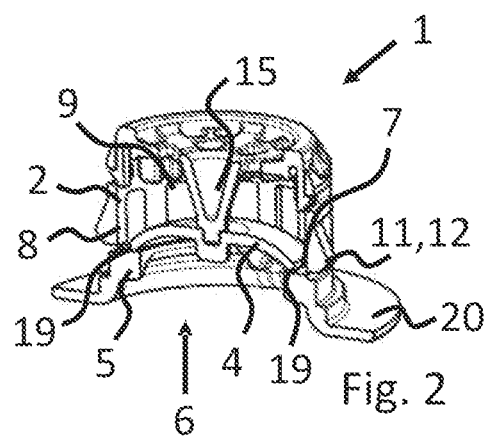
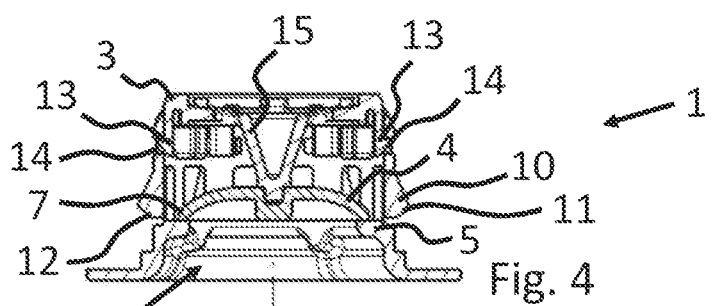
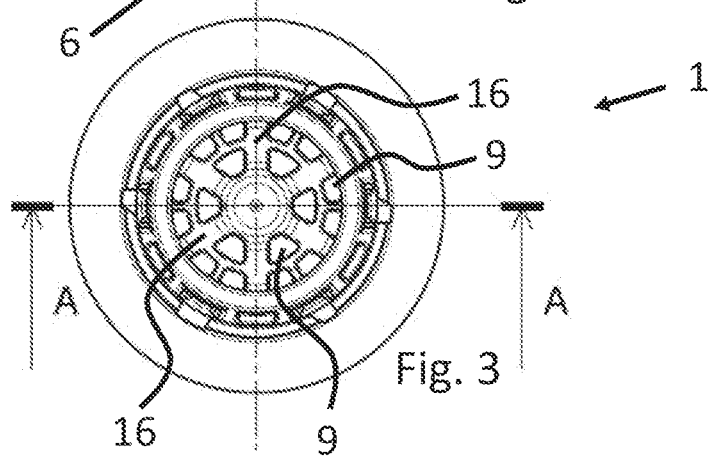
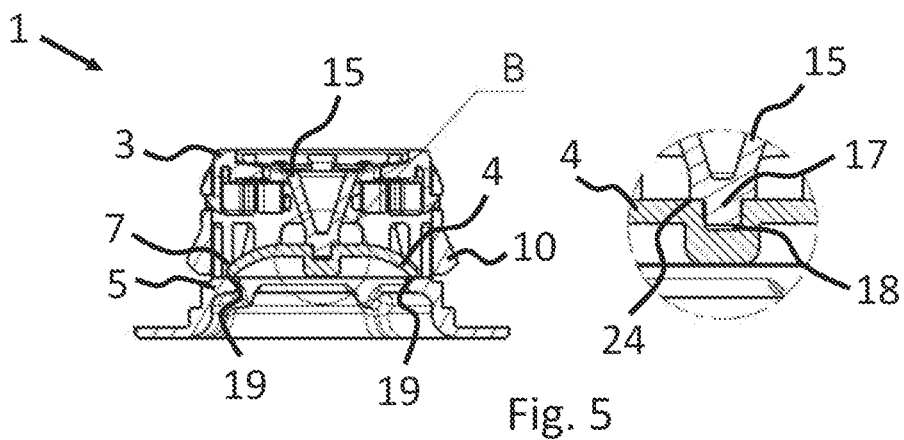

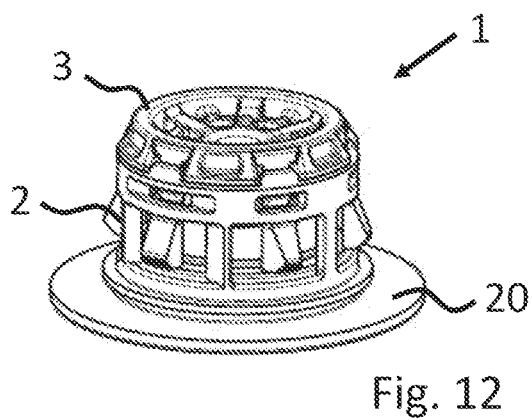
Fig. 12
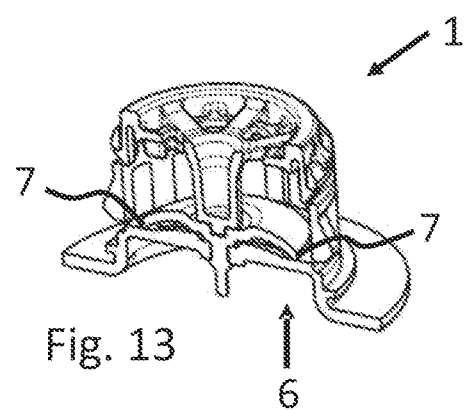
Fig. 13
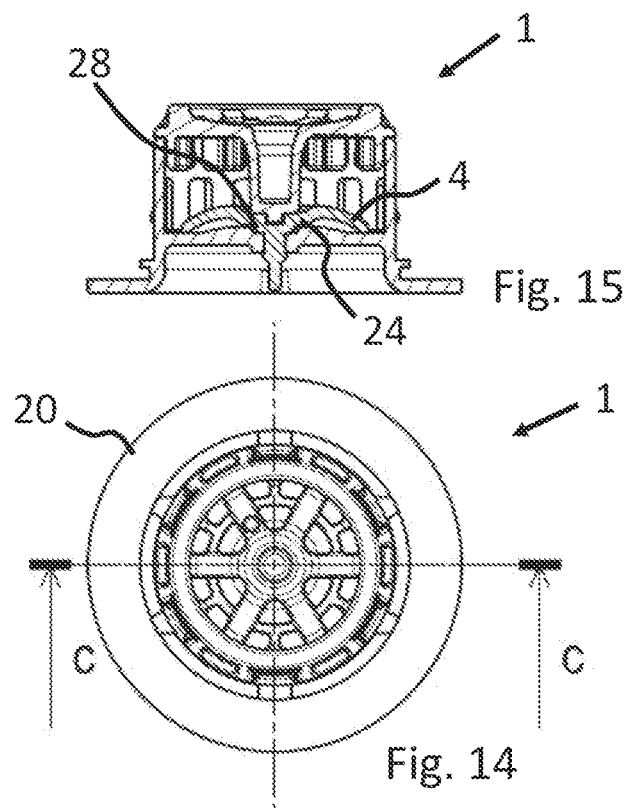
Fig. 15
Fig. 14
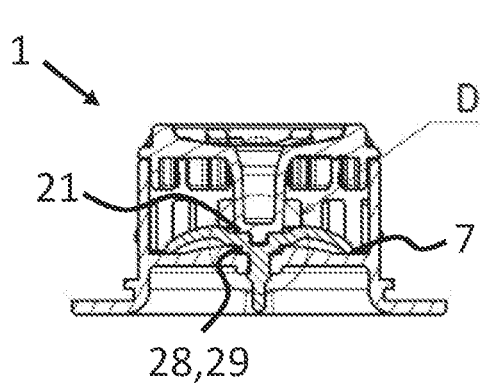
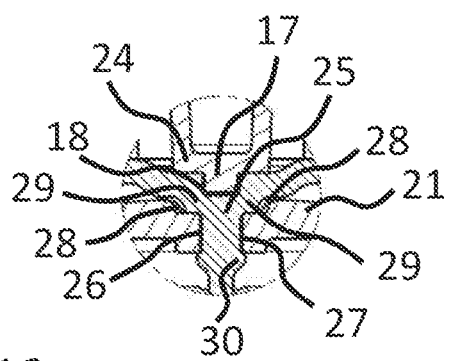
Fig. 16

PRESSURE RELIEF VALVE

TECHNICAL FIELD

The present invention relates to a pressure relief valve.

BACKGROUND

Pressure relief valves protect pressurized spaces or pressure vessels against a pressure increase that is inadmissible for a pressure device or a pressure system. If a response pressure is exceeded, gases, vapors or liquids are discharged into the atmosphere or into collecting pipes.

The pressure relief valve is a pressure relief means that begins to respond when the pressure exceeds a maximum allowable operating pressure. When a predetermined excess pressure is reached, e.g. 10% of the maximum allowable operating pressure, the safety valve has to be fully open. If the safety valve is dimensioned properly, the pressure build-up remains manageable. After the excess pressure has been relieved by blowing off into the environment, the valve closes again, as the case may be, and the system can continue to be operated.

Pressure relief valves are also installed in battery housings for batteries, in particular for high-voltage batteries, for example in electric vehicles.

SUMMARY

The object of the present invention is to provide an alternative to pressure relief valves known in the state of the art.

A further object of the present invention is to provide a compact pressure relief valve requiring little installation space.

It is also an object of the present invention to create a pressure relief valve that is safe and reliable in operation and is simple and inexpensive to produce.

One or more of these objects are achieved by the features of independent Claim 1. Advantageous configurations are specified in the respective dependent subclaims.

According to the invention, a pressure relief valve is provided. Said pressure relief valve comprises a bowl-shaped housing means having a bottom wall comprising an annular sealing wall, wherein the sealing wall delimits a valve through-opening, and a jacket wall, a cover means for covering a housing opening of the housing means opposite to the bottom wall, having a diaphragm holding means which extends in the direction of the bottom wall, a diaphragm means for covering the valve through-opening, wherein the diaphragm means is connected to the diaphragm holding means and disposes said diaphragm holding means sealingly on the annular sealing wall such that the valve through-opening is closed.

According to a first aspect of the present invention, the valve through-opening can have a circular cross-section that is free of struts or the like.

In the context of the present invention, the expression "that the diaphragm means is connected to the diaphragm holding means" means that the diaphragm holding means is at least loosely in contact with or is loosely or fixedly connected to the diaphragm means in a connecting region, wherein a positioning and/or centering of the diaphragm means on the sealing wall or with respect to the valve through-opening by means of the diaphragm holding means is possible with an appropriate structural configuration of a contacting or connecting region between the diaphragm holding means and the diaphragm means.

Movements or vibrations of the pressure relief valve, e.g. when driving or transporting a battery housing equipped with a pressure relief valve, can cause a diaphragm of the pressure relief valve to move (inadvertently). The diaphragm is often also deformed in the process. There is then a risk that the diaphragm means will lift off of the sealing wall or that undesirable gaps or openings will occur and at least partially open the valve through-opening. The diaphragm holding means and the connection between the diaphragm holding means and the diaphragm means ensure that a radially circumferential sealing edge of the diaphragm means is properly prepositioned and positioned, and in particular centered, with respect to the sealing wall delimiting the valve through-opening. The valve through-opening is furthermore sealingly closed by means of the diaphragm means.

The fact that the diaphragm means is connected to the diaphragm holding means and disposes said diaphragm holding means sealingly on the annular sealing wall such that the valve through-opening is closed, provides a pressure relief valve with a particularly simple structure, which is safe and reliable in operation and simple and inexpensive to produce.

The pressure relief valve is in particular characterized in that, on the one hand, the diaphragm holding means is provided for disposing (prepositioning; positioning) and securing or also fastening the diaphragm means. On the other hand, the diaphragm means is mounted in the housing means by means of the diaphragm holding means.

The diaphragm holding means is further characterized in that, due to its dimensions and in particular its extension and/or length in the direction of the bottom wall of the housing means, the diaphragm means can be pretensioned so that it seals and closes the valve through-opening.

Therefore, due to its structural configuration, the diaphragm holding means applies a predetermined force acting in the direction of the sealing wall to the diaphragm means such that the diaphragm means is at least slightly compressed and a radially circumferential sealing edge of the diaphragm means rests sealingly on the sealing wall. A desired predetermined opening pressure of the valve means can accordingly be set via the length of the diaphragm holding means in the direction of the bottom wall and the pressure applied by the diaphragm holding means to the diaphragm means.

The diaphragm means can preferably be approximately bell-shaped or spherical segment-shaped or convex, whereby an edge of the diaphragm facing in the direction of the bottom wall forms a radially circumferential sealing edge, which correspondingly seals and rests on the sealing wall delimiting the valve through-opening under pressure or with predetermined pretension.

The diaphragm holding means can thus be configured and dimensioned such that a radially circumferential sealing edge or sealing lip of the diaphragm means is acted upon by the diaphragm holding means with a force in the direction of the sealing wall such that the sealing edge sealingly rests against the sealing wall under pretension.

Consequently only one component, the diaphragm holding means, which is integrally formed on the cover means, is provided. No other pressurizing or fastening means or placing or positioning means are needed to dispose the diaphragm means sealingly on the valve through-opening or the sealing wall.

The diaphragm means can comprise a connecting or fastening recess in which a connecting or fastening portion of the diaphragm holding means is received in a contacting manner or can be fastened by means of a press fit and/or a respective radially circumferential latching edge and a correspondingly configured radially circumferential latching recess.

According to the first aspect of the present invention in particular, a press fit is preferably provided between the diaphragm means and the diaphragm holding means in the connecting region. Additionally and/or alternatively, however, any type of latching connection can be provided as well. Such connecting means make it possible to easily, quickly, securely and reliably connect the diaphragm means to the diaphragm holding means.

The fastening portion can be cylindrical with a preferably circular cross-section and the fastening recess can correspondingly be configured as a blind hole or bore or also as a through-opening.

In the region of the fastening portion, the diaphragm holding means can in particular comprise a radially circumferential annular pretensioning portion, which extends approximately parallel to the diaphragm.

The pretensioning portion is configured such that the larger the diameter of the pretensioning portion, the greater the pretensioning force with which the diaphragm means is disposed on the sealing wall of the valve through-opening. This means that the wider or the larger the outer diameter of the annular pretensioning portion, the shorter a free leg of the diaphragm means is.

A free leg is understood to be the deformable length of the diaphragm means between the diaphragm holding means and the sealing edge, and thus the sealing wall, in radially outward direction. The shorter this leg is, the less it can deform and the higher the pretensioning force applied by the diaphragm holding means, because a length of the free movable leg is decreased. It is clear that the term "leg" refers to the movable or deformable portion of the diaphragm means, and that therefore a plurality of radially circumferential legs are provided.

The diaphragm means can also merely be in contact with the diaphragm holding means. The diaphragm means can then be configured with or without a connecting recess.

In such a configuration, the connecting portion is an integral component of the pretensioning portion. The greater a diameter of the pretensioning portion, the shorter the legs are, similarly to the foregoing explanations, and the greater the corresponding pretensioning force.

A length or height of the diaphragm holding means, the diaphragm means, can furthermore also be provided to apply more pretensioning force to the diaphragm means. The longer or higher the extension of the diaphragm holding means in a direction orthogonal to the diaphragm means, the more force acts on the diaphragm means and the greater the corresponding pretensioning force.

The housing means and/or the cover means can comprise through-openings for releasing excess pressure escaping from the valve through-openings.

The diameter of the outer jacket wall of the housing means can be approximately less than 40 mm, or less than 35 mm, or less than 30 mm, or less than 25 mm, or less than 20 mm.

In particular in the case of a bore diameter in a carrier part that is smaller than 20 mm, the pressure relief valve can be configured in accordance with the above statements.

This results in an extremely compact pressure relief valve.

Such diameters are primarily provided for a pressure relief valve according to the invention according to the first aspect of the present invention. Only one valve through-opening can then be configured in the bottom wall.

In the context of the present invention, only one valve through-opening is to be understood that said valve through-opening is circular and does not comprise any webs or struts or the like at all to disrupt the valve through-opening, whereby no receiving means for securing a diaphragm means are provided in the central region of the through-opening either.

According to a second aspect of the present invention, in the region of the valve through-opening, the bottom wall can comprise a centering ring, which comprises a diaphragm receptacle in the region of the diaphragm means for receiving a pin of the diaphragm means.

The diaphragm receptacle can be connected to the bottom wall via struts, which are disposed in a radially circumferential manner and equidistant from one another. The diaphragm receptacle forms the centering ring in conjunction with the struts.

The diaphragm receptacle can furthermore be configured to be annular with a through-opening for receiving and/or connecting to the pin of the diaphragm means, or disc-shaped with a blind hole for receiving and/or connecting to a pin portion of the diaphragm means.

The connection or contact between the centering ring and the diaphragm means also serves to dispose or position and center the diaphragm means and its sealing edge on the sealing wall of the valve through-opening. The centering ring can be useful and advantageous for larger pressure relief valves in particular.

The pressure relief valve according to the second aspect of the present invention is provided in particular for larger valves, in which a diameter of the outer jacket wall of the housing means is approximately greater than 25 mm, or greater than 30 mm, or greater than 35 mm, or greater than 40 mm, or greater than 45 mm, or greater than 50 mm, or greater than 55 mm, or greater than 60 mm.

An annular mounting flange can be provided in the region of the bottom wall, whereby a sealing means, preferably a TPE seal or an O-ring seal, is provided between a carrier component and the mounting flange.

The mounting flange allows the pressure relief valve to be connected to a carrier component in a securely and reliably sealing manner, whereby an annular sealing means is provided for sealing.

At least three latching elements for securing to a carrier component can be provided on the jacket wall in a radially circumferential manner and preferably equidistant from one another, wherein each of the latching elements preferably comprises a plurality of latching edges.

The pressure relief valve can be securely and reliably mounted to a carrier component by means of the at least three latching elements. By providing a plurality of latching edges, or a corresponding knurling that forms the latching edges, the pressure relief valve can be mounted to a carrier component in a sealing manner, and in particular with a predetermined holding force, despite any manufacturing tolerances.

The cover means can be connected to the jacket wall of the housing means via latching means and latching recesses disposed in a radially circumferential manner and configured to correspond to one another.

By providing corresponding latching means and latching recesses, the cover means can be quickly and easily mounted on the housing means to form the pressure relief valve.

Because the diaphragm means is already fastened to the diaphragm holding means of the cover means, it is attached in the same work step to the annular sealing wall of the bottom wall of the housing means in a sealing manner and under pretension.

The pressure relief valve can be provided to relieve excess pressure in a battery housing, in particular of an electric vehicle, whereby the battery housing is provided for receiving a battery device. The battery device is preferably a high-voltage battery and the pressure relief valve can be disposed and fastened in a through-opening of a carrier component, in particular the battery housing. The carrier component is in particular an aluminum profile.

BRIEF DESCRIPTION OF THE DRAWINGS

The present invention will be described in more detail in the following on the basis of a design example shown in the figures. The present invention comprises the features shown in the figures. The figures show:

FIG. 1 a perspective view of a pressure relief valve according to the invention according to a first design example of the present invention, FIG. 2 a lateral section through a perspective view of the pressure relief valve, FIG. 3 a plan view from above onto the pressure relief valve, FIG. 4 a lateral sectional view of the pressure relief valve along the line A-A, FIG. 5 a further lateral sectional view of the pressure relief valve with a detail view B, FIG. 6 a further perspective view of the pressure relief valve with a diaphragm means, FIG. 7 a perspective lateral sectional view of the pressure relief valve with a diaphragm means of FIG. 6, FIG. 8 a further perspective view of the pressure relief valve without a diaphragm means, FIG. 9 a perspective lateral sectional view of the pressure relief valve without a diaphragm means of FIG. 8, FIG. 10 a perspective view of a cover means with a diaphragm holding means and the diaphragm means of the pressure relief valve, FIG. 11 a lateral section through a perspective view of FIG. 10.

FIG. 12 a perspective view of a pressure relief valve according to the invention according to a second design example of the present invention, FIG. 13 a lateral section through a perspective view of the pressure relief valve, FIG. 14 a plan view from above onto the pressure relief valve, FIG. 15 a lateral sectional view of the pressure relief valve along the line C-C, FIG. 16 a further lateral sectional view of the pressure relief valve with a detail view D, FIG. 17 a further perspective view of the pressure relief valve with a diaphragm means, FIG. 18 a perspective lateral sectional view of the pressure relief valve with a diaphragm means of FIG. 6, FIG. 19 a further perspective view of the pressure relief valve without a diaphragm means, FIG. 20 a perspective lateral sectional view of the pressure relief valve without a diaphragm means of FIG. 8, FIG. 21 a perspective view of a cover means with a diaphragm holding means and a diaphragm means of the pressure relief valve, and FIG. 22 a lateral section through a perspective view of FIG. 10.

DETAILED DESCRIPTION

Figure 6:
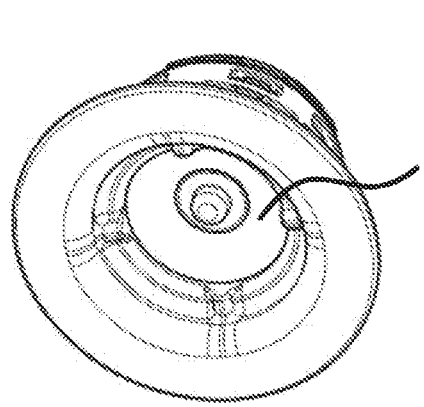
Figure 7:
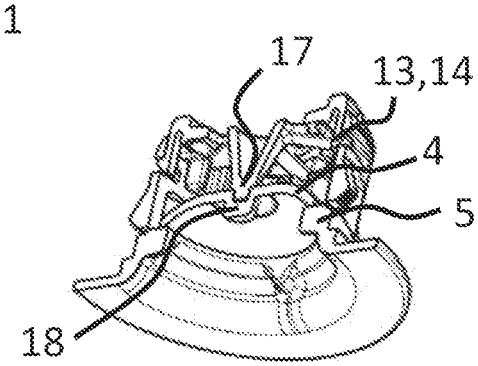
Figure 8:
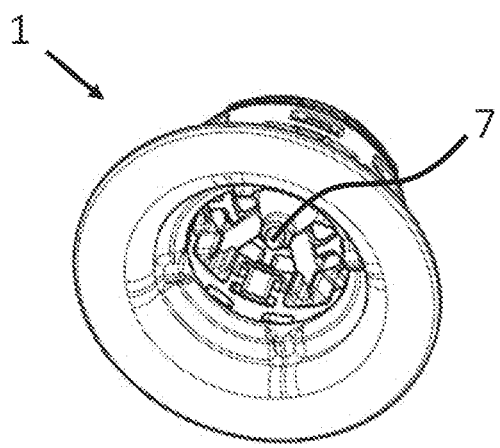
Figure 9:
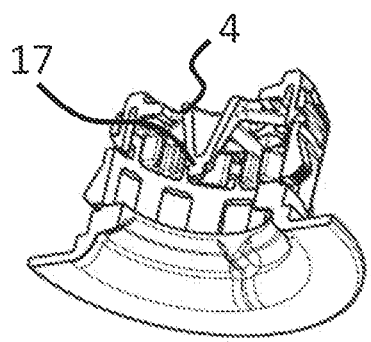
Figure 10:
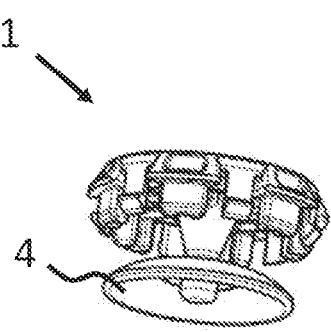
Figure 11:
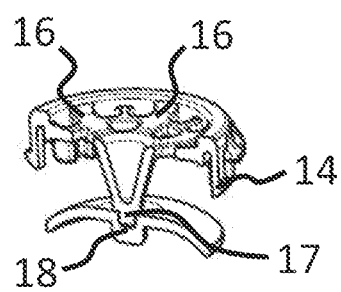

A pressure relief valve 1 according to the invention is described in the following on the basis of a first design example (FIGS. 1 to 11).

The pressure relief valve 1 comprises a bowl-shaped housing means 2, a cover means 3 and a diaphragm means 4.

The bowl-shaped housing means 2 comprises a bottom wall 5. The bottom wall 5 delimits a valve through-opening 6. In the region of the valve through-opening 6, a surface of the bottom wall facing in the direction of the diaphragm means 4 forms an annular sealing wall 7.

A radially circumferential jacket wall 8 is integrally formed on the bottom wall 5.

A plurality of overpressure or through-openings 9 are configured in the jacket wall 8 in a radially circumferential manner and equidistant from one another for releasing excess pressure to be released via the valve through-opening 6.

On an outer surface of the jacket wall 8, there are, for example six, radially circumferential latching elements 10 which extend outward in radial direction and are preferably equidistant from one another for securing the pressure relief valve 1 in a through-opening of a carrier component (not shown).

Each of the latching elements 10 preferably comprises a plurality of latching edges 11, which are configured in the form of a knurling 12. The latching elements 10 are preferably provided adjacent to the overpressure openings 9 in the jacket wall 8 of the housing means 2.

The latching elements 10 are therefore preferably configured to engage behind an edge of a through-opening of the carrier component (not shown). The latching elements 10 can alternatively also be structurally configured to engage in correspondingly configured latching element receiving recesses (not shown) of a carrier component.

Latching recesses 13, which are likewise configured in the form of through-openings, are provided in the jacket wall 8 as well. Said latching recesses are disposed in a radially circumferential manner and equidistant from one another in the jacket wall 8. The latching recesses 13 serve to receive correspondingly configured latching means 14 of the cover means 3 in order to connect them to the housing means 2.

The cover means 3 is approximately disc-shaped, whereby at least two or three or more latching means 14 are integrally formed on a radial outer edge of the cover means in a radially circumferential manner and equidistant from one another for connecting to the housing means 2. The latching means are configured to correspond to the latching recesses 13 of the housing means 2.

Overpressure or through-openings 9 for releasing or relieving excess pressure are furthermore also provided in the cover means 3.

Approximately in the center, the cover means 3 comprises a diaphragm holding means 15 that extends in the direction of the bottom wall 5 of the housing means 2. This diaphragm holding means 15 is connected to the cover means 3 via webs 16, which delimit the overpressure openings 9 of the cover means 3, and is an integral part of said cover means.

The diaphragm holding means 15 is configured in the shape of a pin, in particular a conical pin that tapers in the direction of the bottom wall 5 of the housing means 2. At its end facing in the direction of the bottom wall 2, the diaphragm holding means according to the first design example comprises a cylindrical connecting or fastening portion 17.

In the region of the fastening portion 17, the diaphragm holding means 15 in particular comprises a radially circumferential annular pretensioning portion 24, which extends approximately parallel to the diaphragm means 4.

The pretensioning portion 24 is configured such that the larger the diameter of the pretensioning portion, the greater the pretensioning force with which the diaphragm means 4 is disposed on the sealing wall 7 of the valve through-opening 6. This means that the wider or the larger the outer diameter of the annular pretensioning portion 21, the shorter a free leg of the diaphragm means 4 is.

As explained above, a similar technical effect is possible by changing the height of the diaphragm holding means orthogonally to the diaphragm means.

The cylindrical fastening portion 17 can be disposed in a correspondingly configured connecting or fastening recess 18 of the diaphragm means and is preferably releasably connected to said diaphragm means via a press fit. The fastening recess 18 can be configured as a blind hole. The region of this connection is referred to as the connecting region.

In addition and/or as an alternative to the press fit, a radially circumferential latching edge can also be provided in conjunction with a correspondingly configured latching recess or any suitable form- and/or force- and or friction-locking connection.

Alternatively, it is also possible to provide a simple loose contact between the fastening portion 17 and the fastening recess 18.

The diaphragm means 15 is approximately bell-shaped or half-shell-shaped or spherical segment-shaped and, on its end facing in the direction of the bottom wall 5, comprises a radially circumferential sealing edge 19 for resting sealingly on the sealing wall 7 of the bottom wall 5 of the housing means 2.

The fastening recess 18 is provided approximately in the center in the diaphragm means 15 for preferably releasable connection to the fastening portion 17 of the diaphragm holding means 15.

An integral connection of the diaphragm means 4 to the diaphragm holding means 15 of the cover means 3 using a 2-component injection molding process is possible as well.

In the region of the bottom wall, the housing means 2 further comprises an integrally formed and preferably step-like fastening flange 20 for abutting a through-opening of a carrier component (not shown).

A corresponding step serves as a stop or compression limit for the sealing means.

A corresponding annular sealing means (not shown) in the form of a TPE seal or an O-ring seal can be disposed between the fastening flange 20 and the through-opening of the carrier component. This sealing means can likewise be connected to the fastening flange using a 2-component injection molding process.

Figure 17:
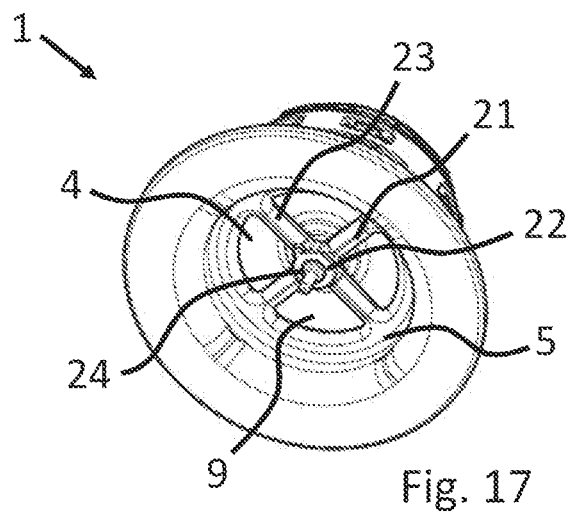
Figure 18:
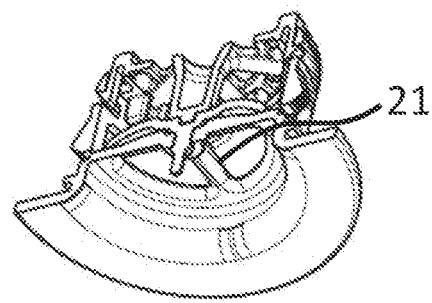
Figure 19:
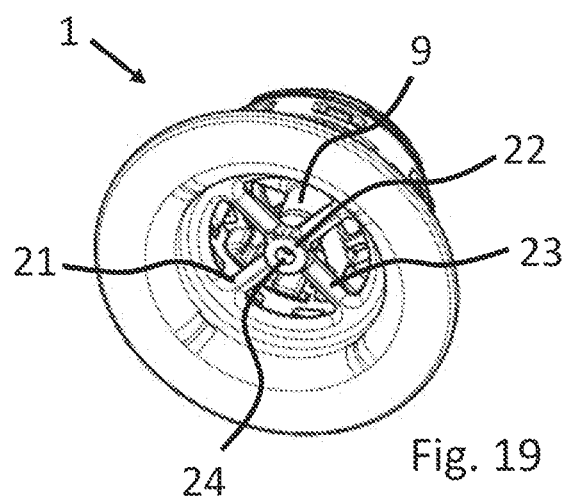
Figure 20:
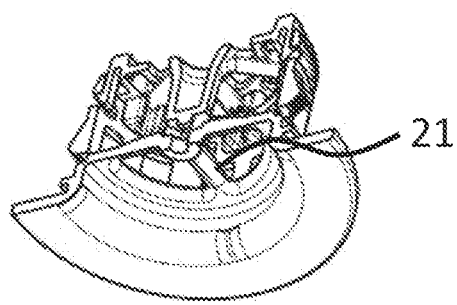
Figure 21:
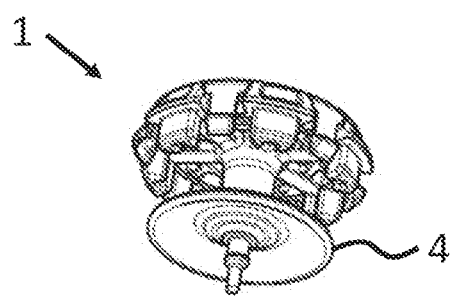
Figure 22:
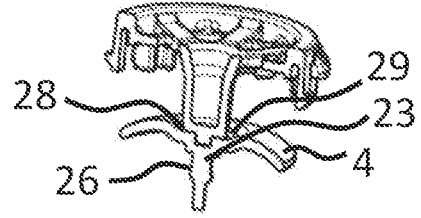

A pressure relief valve 1 according to the invention according to a second design example is described in more detail in the following (FIGS. 12 to 22).

Unless described otherwise, the pressure relief valve 1 according to the second design example comprises the same technical features as the pressure relief valve 1 according to the first design example. The same technical features are provided with the same reference signs.

According to the second design example, the bottom wall 5 can comprise a centering ring 21 in the region of the valve through-opening 6. The centering ring 21 comprises a diaphragm receptacle 22, which is connected to the bottom wall 5 via struts 23.

The centering ring 21 is thus an integral component of the bottom wall.

The diaphragm receptacle 22 is annular with a through-opening 24 for receiving and/or connecting to a pin 25 of the diaphragm means 4.

The struts 23, in conjunction with the bottom wall 5 and the diaphragm receptacle 24, delimit corresponding overpressure openings 9 in the region of the valve through-opening 6.

The struts 23 are disposed in a radially circumferential manner and equidistant from one another. For example, at least three and preferably also four or even five or more struts 23 can preferably be provided.

The diaphragm receptacle 22 can alternatively also be configured as a blind hole (not shown).

The pin 25 is an integral component of the diaphragm means 4 and extends from it in the region of the valve through-opening 6 in the direction of the fastening flange 20. The pin 25 in particular comprises a cylindrical fastening region 26, with which the pin 25 is disposed and secured in the through-opening 27 of the diaphragm receptacle 22.

A radially circumferential fastening web 30 is integrally formed on the pin 25 in the region of the fastening flange 20 behind the fastening region 26 to connect the pin of the diaphragm means to the diaphragm receptacle.

A portion of the pin can also extend beyond the fastening web. The diaphragm can thus be mounted through the bore by pulling rather than pushing (the projecting region can be gripped with pliers, for example) (due to the softness of the diaphragm, pulling may be better than pushing). Such a pin can therefore be provided as a mounting aid.

The through-opening 27 widens in the direction of the diaphragm means 4 to form an approximately circular diaphragm recess 28. In the region of the diaphragm recess, the diaphragm means 4 comprises the correspondingly configured diaphragm portion 29.

A carrier component is in particular an aluminum profile of a battery housing for a high-voltage battery, such as are used in modern electric vehicles. The pressure relief valve is thus configured to relieve any type of excess pressure that may occur in such a battery housing.

Such excess pressure can, for example, be caused by gas formation in the event of a malfunction of the battery or by a fire. The subsequently occurring excess pressure in the battery housing can be released by means of the pressure relief valve according to the invention, whereby, when a predetermined threshold value is exceeded, the diaphragm means, in particular its sealing edge, is elastically deformed and lifted away from the sealing wall of the bottom wall of the housing means.

The escaping gas or the excess pressure is then initially released into a space delimited by the bottom wall, the jacket wall of the housing means and the cover means and released to the outside via the through-opening provided in the cover means and the jacket wall.

LIST OF REFERENCE SIGNS

1 Pressure relief valve
2 Housing means
3 Cover means
4 Diaphragm means
5 Bottom wall
6 Valve through-opening 7 Sealing wall
8 Jacket wall
9 Overpressure opening
10 Latching element
11 Latching edge
12 Knurling
13 Latching recess
14 Latching means
15 Diaphragm holding means
16 Web
17 Fastening portion
18 Fastening arrangement
19 Sealing edge
20 Fastening flange
21 Centering ring
22 Diaphragm receptacle
23 Strut
24 Pretensioning portion
25 Pin
26 Fastening region
27 Through-opening
28 Diaphragm recess
29 Diaphragm portion
30 Fastening web

What is claimed is:

1. Pressure relief valve comprising:
a bowl-shaped housing means having:
   a bottom wall comprising an annular sealing wall, wherein the sealing wall delimits a valve through-opening, and
   a jacket wall,
a cover means for covering a housing opening of the housing means opposite to the bottom wall, and having a diaphragm holding means which extends in the direction of the bottom wall,
a diaphragm means for covering the valve through-opening,
wherein the diaphragm means is connected to the diaphragm holding means and is disposed sealingly on the annular sealing wall such that the valve through-opening is closed, wherein the diaphragm holding means tapers in the direction of the bottom wall and is an extension of the cover means,
wherein at least three latching elements for securing to a carrier component are provided on the jacket wall in a radially circumferential manner and equidistant from one another, wherein each of the latching elements comprises a plurality of latching edges located above the bottom wall.

2. Pressure relief valve according to claim 1, wherein
the diaphragm holding means is configured and dimensioned such that a radially circumferential sealing edge of the diaphragm means is acted upon by the diaphragm holding means with a force in the direction of the sealing wall such that the sealing edge sealingly rests against the sealing wall under pretension.

3. Pressure relief valve according to claim 1, wherein
the diaphragm means comprises a fastening recess in which a fastening portion of the diaphragm holding means is received in a contacting manner or can be fastened releasably by means of a press fit.

4. Pressure relief valve according to claim 1, wherein
the housing means and/or the cover means comprise through-openings for releasing excess pressure escaping from the valve through-opening.

5. Pressure relief valve according to claim 1, wherein
only one valve through-opening is configured in the bottom wall.

6. Pressure relief valve according to claim 1, wherein
in the region of the valve through-opening, the bottom wall comprises a centering ring, which comprises a diaphragm receptacle in the region of the diaphragm means for receiving a pin of the diaphragm means.

7. Pressure relief valve according to claim 1, wherein
an annular mounting flange is provided in the region of the bottom wall, wherein a sealing means can be disposed between a carrier component and the mounting flange.

8. Pressure relief valve according to claim 1, wherein
the cover means can be connected to the jacket wall of the housing means via latching means and latching recesses disposed in a radially circumferential manner and configured to correspond to one another.

9. Pressure relief valve according to claim 1, wherein
the pressure relief valve is provided for relieving excess pressure in a battery housing for receiving a battery device, wherein the pressure relief valve can be disposed and fastened in a through-opening of the battery housing, wherein the battery housing comprises aluminum.

10. A pressure relief valve, comprising:
a bowl-shaped housing having:
   a bottom wall comprising an annular sealing wall, wherein the sealing wall delimits a valve through-opening, and
   a jacket wall,
a cover for covering a housing opening of the housing opposite to the bottom wall, and having a diaphragm holder extending in the direction of the bottom wall,
a diaphragm for covering the valve through-opening, wherein the diaphragm is connected to the diaphragm holder and is disposed sealingly on the annular sealing wall such that the valve through-opening is closed;
wherein the jacket wall includes a plurality of openings for pressure relief and the cover includes multiple through openings for pressure relief, and wherein a plurality of latching elements project outwardly from the jacket wall at locations above the bottom wall for securing the pressure relief valve to a carrier component.

11. The pressure relief valve of claim 10, wherein the jacket wall includes a plurality of latching through openings and the cover includes a plurality of latching protrusions engaged in the latching through openings to hold the cover on the bowl-shaped housing.

* * * * *